Figure 1:
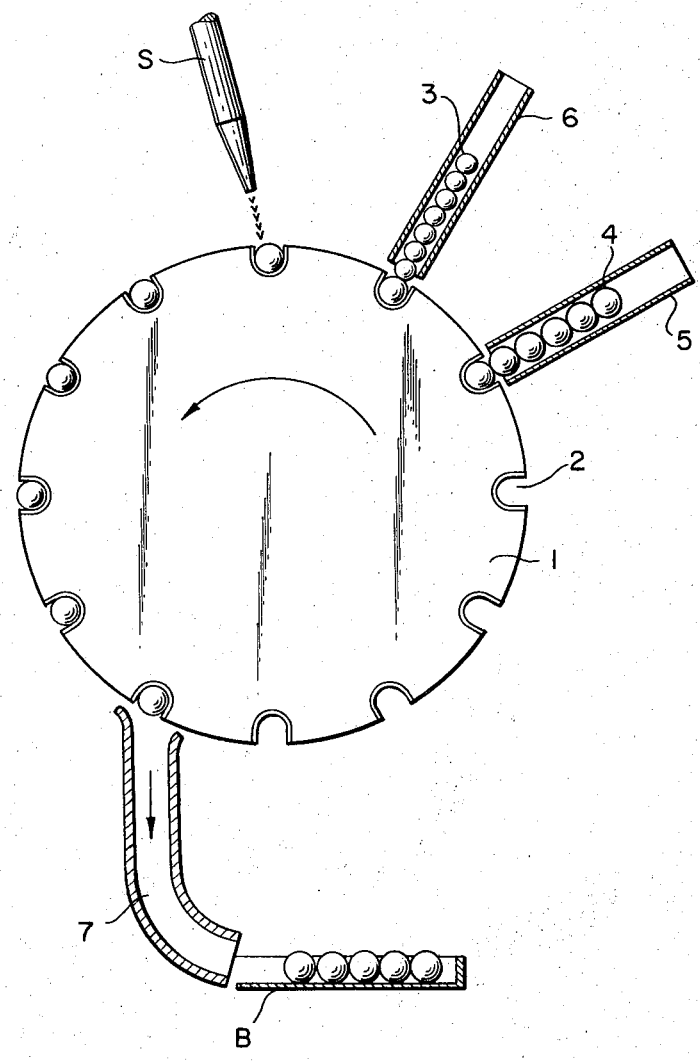

United States Patent [19]
Hepp et al.

[11] 3,824,369
[45] July 16, 1974

[54] MANUFACTURING DEVICE FOR SHAFTS WITH SPHERICAL SHAFT ENDS

[75] Inventors: Wolfgang Hepp, Immenstaad; Klaus Pimiskern, Friedrichshafen; Werner Herbert, Markdorf, all of Germany

[73] Assignee: Dornier Systems GmbH

[22] Filed: June 25, 1973

[21] Appl. No.: 373,256

[30] Foreign Application Priority Data
Aug. 11, 1972 Germany............................. 2239619

[52] U.S. Cl............. 219/121 EB, 219/103, 219/158, 269/57
[51] Int. Cl.............................................. B23k 15/00
[58] Field of Search....... 219/121 EB, 121 EM, 103, 219/158, 107, 101; 269/57, 87.2

[56] References Cited
UNITED STATES PATENTS

| | | | |
|---|---|---|---|
| 2,154,243 | 4/1939 | Langhans............................ | 219/103 |
| 2,946,583 | 7/1960 | Conner................................ | 269/57 |
| 2,975,775 | 3/1961 | Macura............................... | 219/107 X |
| 3,310,301 | 3/1967 | Netta et al......................... | 269/57 X |
| 3,592,995 | 7/1971 | Hirrichs............................. | 219/121 EB |
| 3,694,614 | 9/1972 | Bihler................................ | 219/103 |

*Primary Examiner*—J. V. Truhe
*Assistant Examiner*—G. R. Peterson
*Attorney, Agent, or Firm*—James E. Bryan, Esq.

[57] ABSTRACT

This invention relates to an apparatus for manufacturing shafts with spherical shaft ends, particularly shafts for pedestal bearings, comprising a horizontal conveyor drum means adapted to rotate in an indexing manner, a plurality of axially-extending groove means on the circumference of said drum means, means for placing shafts and balls to be connected into said grooves, a pair of relatively displaceable receiving shaft means for holding said shafts and balls together on said drum means while being connected, means for synchronously driving said receiving shaft means, and means for connecting said shafts and balls.

10 Claims, 4 Drawing Figures

MANUFACTURING DEVICE FOR SHAFTS WITH SPHERICAL SHAFT ENDS

The present invention relates to a manufacturing device for making shafts having a spherical end, particularly shafts for pedestal bearings.

In pedestal bearings which, in accordance with the above-named principle, are composed of a rotatable shaft with a spherical shaft end and a corresponding segment-shaped supporting member and which are used, for example, for high-speed apparatuses, gyroscopes, centrifuges, and the like, it is necessary to mount the ball and exactly concentrically with respect to the shaft axis. The exact concentric position of the ball on the shaft is a decisive factor for the bearing load and operational smoothness of such pedestal bearings.

It is the object of the present invention to achieve, in connection with the series production of shafts having a spherical shaft end, a uniform and precise centering and simultaneously an automatic production flow, particularly an exact connection between the shaft and the ball, for example by welding.

This object is obtained with a manufacturing device according to the present invention employing a conveyor drum mounted with an essentially horizontal axis of rotation and which is adapted to rotate in a stepwise or indexing manner. The drum is provided with axially-extending grooves or notches distributed around the circumference thereof for successively receiving shafts, having conical centering bores at one end thereof, and balls to be welded thereto. The shafts and balls are conveyed from separate magazines into the grooves. The shafts and balls are held in contact with each other in each groove by a pair of relatively displaceable receiving shafts which are positioned at the ends of the groove and are provided at the inner ends thereof with conical bores, the shafts being adapted to be synchronously driven.

The grooves at the circumference of the conveyor drum and designed for receiving the parts to be worked on are so designed that the cross-section of the grooves corresponds essentially to the diameter of the shaft to be received therein. In proximity to one end thereof, the groove has a cross-sectional enlargement in order to receive or accommodate therein a ball having a larger diameter than the shaft. When the receiving shafts are axially displaced with respect to each other, they will clamp — with their conical bored parts — the shaft and the respectively coordinated ball against each other, thereby centering the same. Either both receiving shafts or only one of them may be axially displaceable. It is preferable that the receiving shaft which is coordinated to the ball be stationary and that only the other receiving shaft be axially displaceable. At the connecting point between the ball and the shaft, the shaft end has a conical bore, as already set forth hereinabove, so that a precise centering of the parts to be connected effectively takes place. This receiving and centering operation is effected at the point of working, for example a welding operation, or the like. During welding with an electron beam welding apparatus, the two receiving shafts are synchronously driven with one another so that the ball may be connected at the contact point thereof with the shaft to be welded thereto. Due to the axial fixation of the receiving shaft which is adjacent the ball, a very precise infeed or delivery to the place of working is assured.

Figure 2:
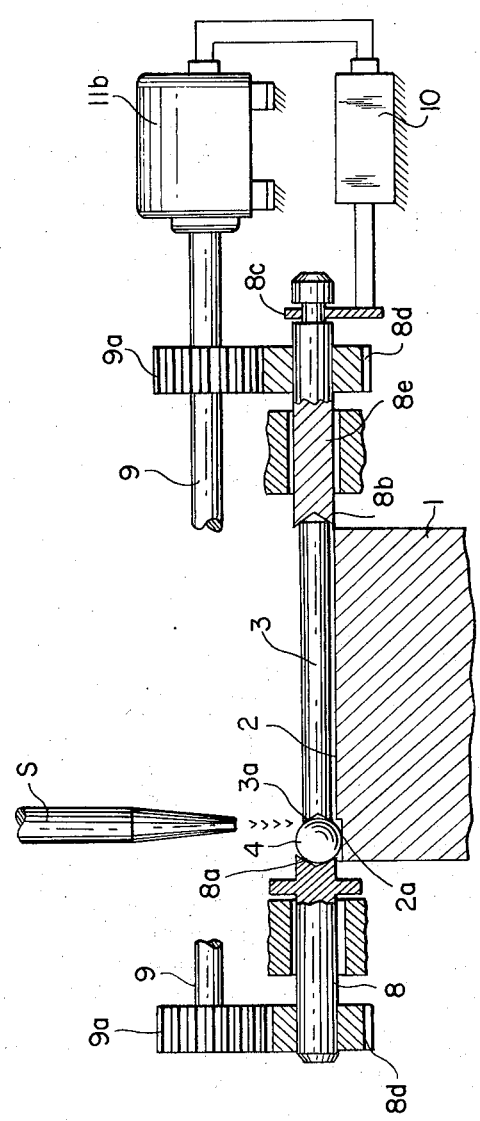
Figure 2A:
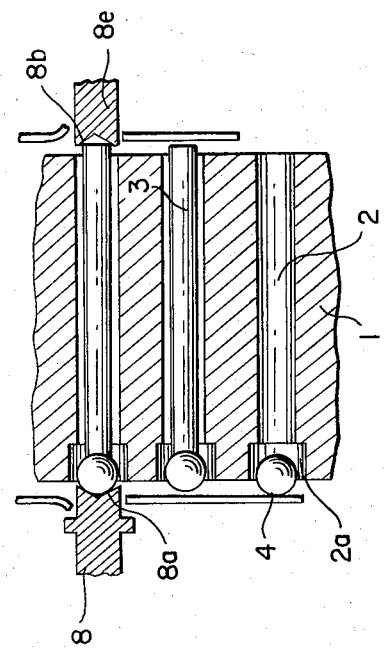
Figure 3:
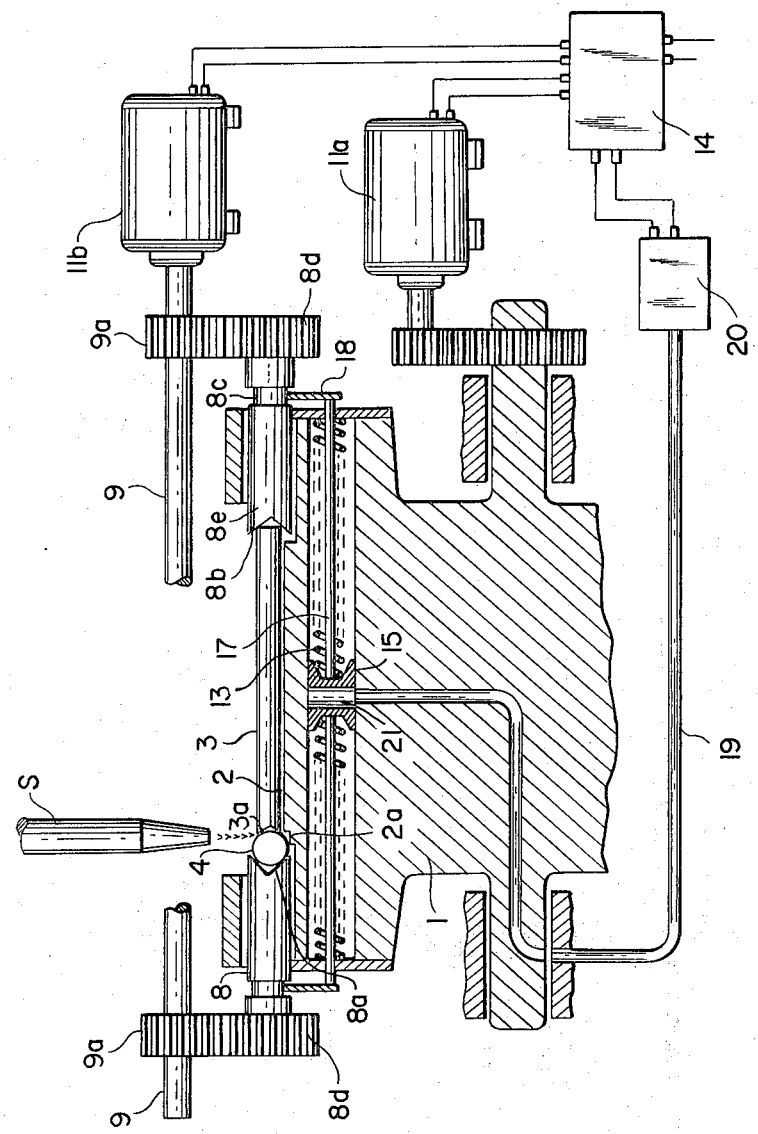

One embodiment according to the present invention will now be described in further detail hereinbelow with reference to the accompanying drawings, wherein FIG. 1 illustrates the manufacturing device proposed by the present invention schematically and in a cross-sectional view thereof;

FIG. 2 illustrates the inventive manufacturing device schematically and in a longitudinal cross-sectional view thereof, FIG. 2a shows a part of the conveyor drum in a top plan view, and FIG. 3 is a further development of the device according to FIG. 2.

FIG. 1 schematically represents a conveyor drum 1 which rotates in the direction of the arrow, and having grooves 2 extending in an axial direction. The grooves 2 serve for receiving the shafts 3 and the balls 4 which slide from separate magazines 5 and 6 into the grooves 2. A welding apparatus S, as indicated, and an ejecting device 7 are positioned at the circumference of the conveyor drum 1. By a driving means, not shown, the conveyor drum 1 is in each case rotated further in a steplike or indexing fashion by the groove distance.

The magazines 5 and 6 in which the balls 4 and the shafts 3 are respectively located are so positioned at the circumference of the conveyor drum 1 in the groove distance that the balls 4 and the shafts 3 can slide into the groove. Present at one end of the groove 2 is an enlarged or widened part. Initially a ball 4 is introduced into this part. After the rotation of the conveyor drum 1 by one groove distance, the coordinated shaft 3 slides into the groove. During the next step, the shaft 3 and the ball 4 are gripped by a centering device, shown in FIG. 2 and including receiving shafts 8 and 8e, and centered at the place of the working operation. After the welding together of the shaft 3 and the ball 4, they are removed from the conveyor drum 1 by way of an ejector device 7, which has not been fully illustrated, and fed or passed on to a container B. The speed of the advance of the conveyor drum 1 depends upon the welding time required for one connection or weld and may be correspondingly preset at a step-by-step switching device, not shown.

In FIG. 2, the device together with the conveyor drum 1 thereof is shown in cross-section. The axis of rotation of the conveyor drum 1 has been indicated in dash-dotted lines. FIG. 2a shows a part of the conveyor drum 1 in a top plan view. Formed in the conveyor drum 1 are grooves 2 which have at the left end thereof an enlargement 2a. The groove dimensions are so selected that the shaft 3 to be connected will fit into the long part of the groove, and the balls 4 to be secured to the shaft will fit into the enlarged part 2a. The shaft 3 has at the left end thereof a centering bore 3a for purposes of centering the ball 4. Exteriorly of the conveyor drum 1, the receiving shafts 8 and 8e are mounted. The receiving shaft 8 provided at the left in the drawing is not axially displaceable, but is rotatable in the mounting thereof. It is rotated by means of a pinion 8d mounted upon its end, which is in meshing engagement with a drive pinion 9a. The receiving shaft 8e illustrated on the right side of the conveyor drum 1 is both axially displaceable and rotatable. It is rotated by means of a pinion 8d thereon, which again is in meshing engagement with a drive pinion 9a. The axial displacement of the right receiving shaft 8e is effected by means of a drive mechanism 10, not shown, and which engages via a rod system into a groove 8c of the receiving shaft 8e. Both receiving shafts 8 and 8e have conical bores at the ends thereof facing the conveyor drum 1. The conical bore 8a of the left receiving shaft 8 serves for centering the ball 4, and the conical bore 8b of the right receiving shaft 8e serves for centering the shaft 3 when the right receiving shaft 8e is displaced against the fixed left receiving shaft 8. The shaft 3 and the ball 4 to be connected are centered in this manner and can be connected with each other at any time. The connection is formed in this embodiment by means of an electron beam welding apparatus identified with reference symbol S. For performing the welding operation, the two receiving shafts 8 and 8e, the aforementioned pinions 8d, and the drive pinions 9a on the rotatable shaft 9 are synchronously rotated. The drive is effected by means of the schematically shown drive mechanism 11b. A flawless welded connection between the ball 4 and the shaft 3 is effected in this manner.

In FIG. 2a, three successive steps for the manufacture are indicated. In the first step, a ball 4 is placed into the enlarged part 2a of the groove 2. By virtue of the shape of the enlarged part and with the aid of a holding or supporting device located outside of the conveyor drum 1, which has not been further illustrated, for example guide strips, the ball 4 is held in the position thereof. In the second step — as shown in the center groove — a shaft 3 is placed into the long part of the groove. This shaft 3 also may be secured against falling out or against too extensive an axial displacement by means of a guide strip. The ball 4 and the shaft 3 are therewith prepared for being welded together. For the welding operation proper, the receiving shafts 8 and 8e on both sides, together with their conically bored parts 8a and 8b will operate in the manner described above. This third step is illustrated in the uppermost groove.

FIG. 3 is an illustration of another design of the manufacturing device in a longitudinal cross-section thereof. It comprises a conveyor drum 1 which is driven stepwise or indexed by means of the drive mechanism 11a. The drive is controllable by means of a step-by-step switching device 14, not further illustrated herein. Also shown is a groove 2 in which is placed a shaft 3. The shaft end shown on the left has a centering bore 3a. Adjacent this shaft end is an enlarged groove part 2a which receives the ball 4. At both ends of the groove 2, one receiving shaft 8 and 8e each is axially displaceably positioned in the conveyor drum 1. In each groove 2 of the conveyor drum 1 is such a pair of receiving shafts 8 and 8e positioned in the conveyor drum. The two displaceable receiving shafts 8 and 8e are provided, at the ends thereof facing the groove 2, with conical bores 8a and 8b and have at the other ends thereof drive pinions projecting beyond the end faces of the drum, which in the oprative position are in meshing engagement with a pair of pinions 9a mounted on the common drive shaft 9. A drive mechanism 11b controlled by the step-by-step switching device 14 rotates the drive shaft 9 which is paraxial to the conveyor drum 1.

The operative position is attained in each case when, during the stepwise advance of the conveyor drum 1, a pair of drive pinions 8d comes into meshing engagement with the pair of pinions 9a.

The receiving shafts 8 which are displaceable in the axial direction and which receive the workpieces to be connected, namely the shaft 3 and the ball 4, are clamped by means of springs 13 by way of a thrust or sliding rod system 17. The sliding rod system 17 has at one end thereof a piston 15 and at the other end thereof a fork 18 which engages into a groove 8c of the receiving shaft 8e. The ejection operation is carried out either pneumatically or hydraulically, in a manner not further illustrated herein, by applying pressure to the pistons 15 via a pressure line 19 which is controlled by way of a valve 20.

As has already been described in connection with FIG. 1, the shafts 3 and the balls 4 are fed from magazines 5 and 6 to the groove 2 in the conveyor drum 1. The clamping and centering operation for the shafts 3 and the balls 4 is accomplished by an axial sliding together of the receiving shafts 8 and 8e so that by means of the conical bore 8a the ball 4 is pressed into the centering bore 3a of the shaft 3, and the opposite end of the shaft 3 is pressed into the conical bore 8b. This results in and produces a precise centering of the ball 4 with respect to the shaft 3.

After the receiving and centering operations, the shaft 3 and the ball 4 are conveyed to the welding apparatus S, for example an electron beam welding apparatus, during the indexing or timed advance of the conveyor drum 1. For the welding operation, the shaft 3 and the ball 4 must be rotated in synchronism. For this purpose — as has already been mentioned above — the drive pinions 8d will engage with the pinions 9a, which are rigidly connected with the drive shaft 9. They are synchronously moved by means of a drive pinion 11b. At the same time, the welding apparatus S is switched on via the step-by-step switching device 14 and welds together the synchronously rotating shaft 3 and the ball 4.

The ejection of the welded parts takes place by applying pressure to the piston chamber 21, at which time the pistons 15 are displaced against the action of the springs 13 and urge the receiving shafts 8 and 8e apart in the axial direction, thereby freeing the workpiece. It is also possible, of course, to provide for other structural designs, for example of the receiving shafts and the displacing kinematics thereof, without departing from the spirit and scope of the present invention.

It will be obvious to those skilled in the art that many modifications may be made within the scope of the present invention without departing from the spirit thereof, and the invention includes all such modifications.

What is claimed is:

1. An apparatus for manufacturing shafts with spherical shaft ends, particularly shafts for pedestal bearings, comprising a horizontal conveyor drum means adapted to rotate in an indexing manner, a plurality of axially-extending groove means on the circumference of said drum means, means for placing shafts and balls to be connected into said grooves, a pair of relatively displaceable receiving shaft means for holding said shafts and balls together on said drum means while being connected, means for synchronously driving said receiving shaft means, and means for connecting said shafts and balls.

2. An apparatus according to claim 1 in which said shafts to be connected to said balls have conical centering bores at the ends to be connected to said balls.

3. An apparatus according to claim 1 in which said groove means are provided at one end thereof with enlarged portions coresponding to the dimensions of said balls.

4. An apparatus according to claim 3 in which said receiving shaft means are mounted exteriorly of said drum means.

5. An apparatus according to claim 4 in which the receiving shaft means adjacent the enlarged groove portion is rotatable and axially stationary.

6. An apparatus according to claim 3 in which said receiving shaft means are mounted interiorly of said drum means.

7. An apparatus according to claim 6 in which said receiving shaft means are displaced by pressure medium means acting against elastic force.

8. An apparatus according to claim 1 including drive pinion means on said receiving shaft means.

9. An apparatus according to claim 8 including drive pinion means on a drive shaft mounted axially parallel to said conveyor drum means, said pinion means in the operative position thereof being in meshing engagement with the drive pinion means on said receiving shaft means.

10. An apparatus according to claim 1 in which said receiving shaft means have conical bores at the inner ends thereof.

* * * * *